United States Patent
Hamm

(10) Patent No.: US 11,345,592 B2
(45) Date of Patent: May 31, 2022

(54) APPARATUS AND METHOD FOR HYDROGEN PRODUCTION FROM AN ALKALI METAL AND WATER

(71) Applicant: Earl Lorenzo Hamm, Conyer, GA (US)

(72) Inventor: Earl Lorenzo Hamm, Conyer, GA (US)

( * ) Notice: Subject to any disclaimer, the term of this patent is extended or adjusted under 35 U.S.C. 154(b) by 0 days.

(21) Appl. No.: 16/940,572

(22) Filed: Jul. 28, 2020

(65) Prior Publication Data

US 2020/0369519 A1    Nov. 26, 2020

Related U.S. Application Data

(63) Continuation of application No. 16/119,180, filed on Aug. 31, 2018, now abandoned.

(51) Int. Cl.
| | |
|---|---|
| *C01B 3/10* | (2006.01) |
| *B01D 19/00* | (2006.01) |
| *B01J 8/02* | (2006.01) |
| *C02F 1/20* | (2006.01) |
| *C02F 101/10* | (2006.01) |

(52) U.S. Cl.
CPC ............... *C01B 3/10* (2013.01); *B01D 19/00* (2013.01); *B01J 8/0278* (2013.01); *B01J 8/0285* (2013.01); *C01B 3/105* (2013.01); *C02F 1/20* (2013.01); *B01J 2208/00477* (2013.01); *B01J 2219/0009* (2013.01); *B01J 2219/00058* (2013.01); *B01J 2219/00162* (2013.01); *C02F 2101/10* (2013.01)

(58) Field of Classification Search
CPC ..................................................... Y02E 60/36
USPC ......... 48/61, 108, 204; 423/650, 652, 648.1, 423/657
See application file for complete search history.

(56) References Cited

U.S. PATENT DOCUMENTS

| | | | | |
|---|---|---|---|---|
| 3,969,495 | A * | 7/1976 | Dreyfuss ................ | C01B 3/068 423/658.2 |
| 4,207,095 | A * | 6/1980 | Anderson ................ | C01B 3/08 420/526 |
| 4,287,169 | A * | 9/1981 | Anderson ................ | C01B 3/08 420/489 |
| 5,690,902 | A * | 11/1997 | Werth ................ | H01M 8/0606 423/658 |
| 5,817,157 | A * | 10/1998 | Checketts ................ | C06D 5/00 48/61 |
| 8,012,223 | B2 * | 9/2011 | McGill ..................... | C01B 3/08 423/644 |
| 8,690,974 | B2 * | 4/2014 | Scattergood ............. | C01B 3/04 48/61 |
| 8,696,936 | B2 * | 4/2014 | Garrido Escudero .... | C01B 3/08 252/373 |

(Continued)

FOREIGN PATENT DOCUMENTS

WO    WO-0206153 A1 *    1/2002    ............ C01B 3/042

*Primary Examiner* — Nina Bhat
(74) *Attorney, Agent, or Firm* — Andrew Morabito

(57) ABSTRACT

A method for creating hydrogen gas comprising; providing a first quantity of water to a preparation chamber. heating a quantity of the water within a first sealed pressurized chamber, wherein the water enters a gaseous state, directing, the gaseous water into a reaction chamber, initiating a reaction between the water and a quantity of alkali fragments within a reaction chamber to produce hydrogen and an alkali hydroxide, separating the hydrogen gas from the alkali hydroxide, and recovering the hydrogen gas.

14 Claims, 1 Drawing Sheet

(56) References Cited

U.S. PATENT DOCUMENTS

| | | | | |
|---|---|---|---|---|
| 8,828,108 B2* | 9/2014 | McGill | ............... | B01J 4/004 48/61 |
| 9,102,529 B2* | 8/2015 | Phillips | ............... | H01M 8/0656 |
| 9,169,976 B2* | 10/2015 | Peterson | ............... | F17D 1/00 |
| 10,858,269 B2* | 12/2020 | Burch | ............... | C01D 7/00 |
| 2010/0015477 A1* | 1/2010 | McGill | ............... | B01J 4/001 429/409 |
| 2010/0061923 A1* | 3/2010 | Reddy | ............... | C01B 3/10 423/600 |

* cited by examiner

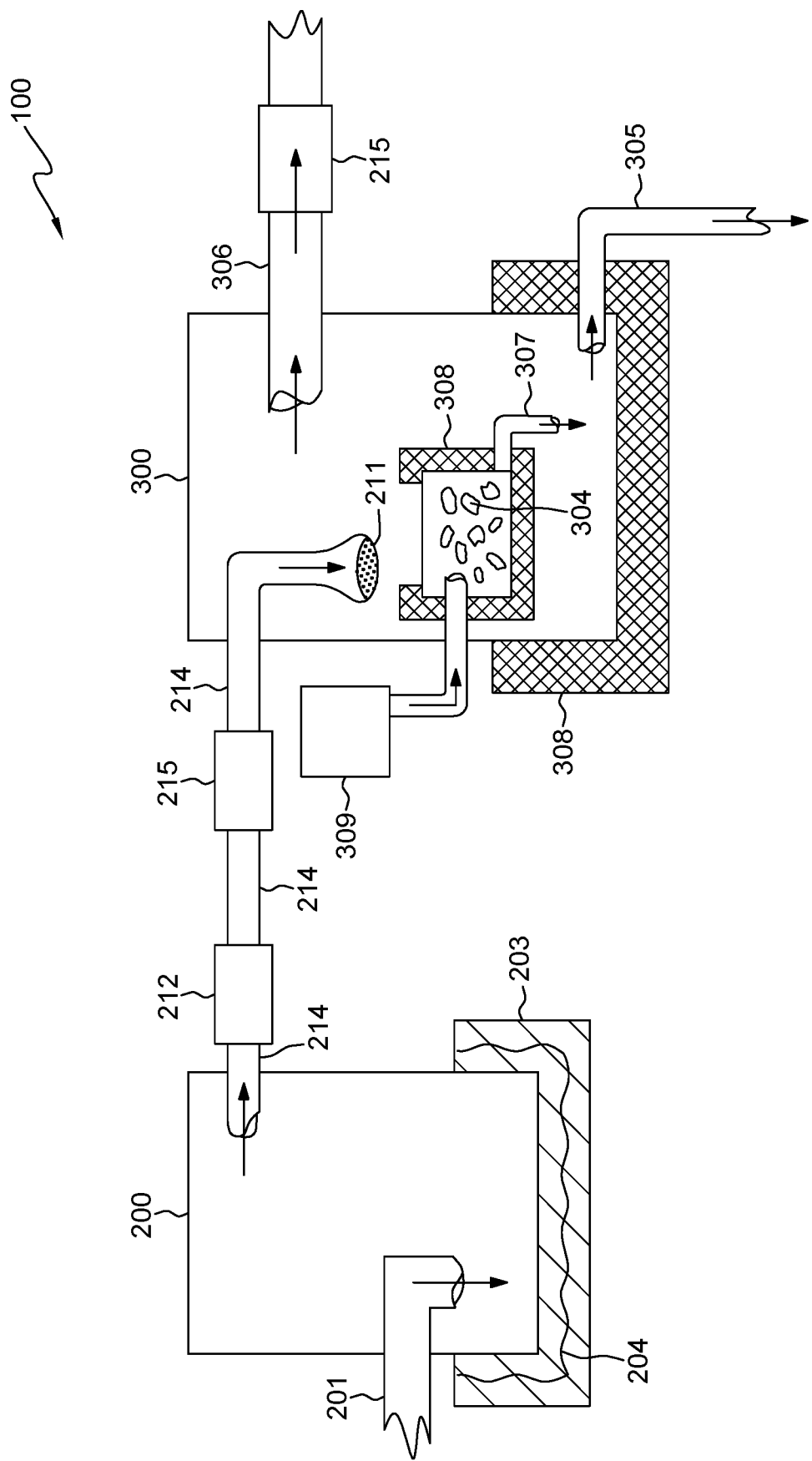

APPARATUS AND METHOD FOR HYDROGEN PRODUCTION FROM AN ALKALI METAL AND WATER

BACKGROUND OF THE INVENTION

The present invention relates to a method and apparatus for hydrogen production, and more particularly to using metallic sodium and water to product a reaction which results in a usable hydrogen by-product.

There is a continuing effort to provide alternative fuels from the point of view of reducing dependence on fossil fuels and to reduce or eliminate the pollution which results from the burning of such fuels.

It is agreed that hydrogen is an abundant fuel and non-polluting due to water being a by-product of the combustion of the hydrogen. Nevertheless, hydrogen continues to be underutilized as a fuel in light of the problems encountered in achieving a safe, efficient, and economical method of producing it in sufficient quantities for practical use. Moreover, at atmospheric pressure, hydrogen contains about one-fourth the energy contained in an equal volume of gasoline.

While the advantages of using a fuel such as hydrogen to replace fossil fuel as a primary energy source are many, no single approach has emerged which will provide a convenient means whereby hydrogen can be economically produced in a form, whether gaseous, or liquified, which makes it useful in the applications noted above. Still further, the methods currently disclosed in the prior art of producing useful chemical hydrides for the methodology discussed above, and which could potentially be used to implement, at least in part, a hydrogen infrastructure has still remained elusive.

As a general matter, current methods of producing hydrogen have been viewed by most researchers as being expensive and very energy intensive. It has long been known that hydrogen can be produced from a chemical reaction of an alkali metal with water and various arrangements that have been devised to enclose a reactive material, such as an alkali metal, or metal hydride, that which, upon exposure to water, produces hydrogen as a product of that reaction. The reaction of alkali metals such as sodium with water to form hydrogen and the alkali metal hydroxide is well known.

At the same time, sodium being the 6th most common element in the earth's crust, technology for the industrial production of metallic sodium is well established. The relatively low melting point of metallic sodium, 98 degrees C., the specific gravity of less than 1, and the specific heat of only 0.3 make it useful as a coolant for fast-breeder reactors. It is also used to produce alcoholates by causing it to react with alcohols in an insert gas atmosphere.

When metallic sodium is caused to react with water hydrogen gas will be produced. However, metallic sodium has not been considered a material with a varied range of applications; the tendency has been to use it only as an experimental material for the production of hydrogen gas. This is because metallic sodium is a highly hazardous substance that oxidizes very quickly when it comes in contact with air and when it comes in contact with water reacts rapidly to produce hydrogen gas and immediately ignites. Therefore, extreme care must be taken when handling this material.

Therefore, a method of producing hydrogen which addresses these and other perceived shortcomings in the prior art teachings and practices is the subject matter of the present application.

SUMMARY

Accordingly, it is an objective of the present invention an apparatus for generating hydrogen gas comprising; a preparation chamber having a liquid water inlet, a heating element distal to an interior cavity of the preparation chamber, and a first end of a vapor water outlet; a mechanical pump secured to a second end of the vapor water outlet and a first end of a vapor water inlet; a disbursement member secured to a second end of the vapor water inlet; and a reaction chamber having a reaction container positioned distal to the disbursement member, and the reaction container having a byproduct outlet, and a hydrogen exhaust outlet positioned distal to the reaction container.

Accordingly, the present invention, may be comprised of a method for creating hydrogen gas comprising: providing a first quantity of water to a preparation chamber; heating a quantity of the water within a first sealed pressurized chamber of the preparation chamber, wherein the first quantity of water transitions into a gaseous state; directing, the gaseous water into a reaction chamber; initiating a reaction between the water and a quantity of alkali fragments within a second chamber of the reaction chamber to produce hydrogen and an alkali hydroxide; separating the hydrogen gas from the alkali hydroxide; and recovering the hydrogen gas.

The present invention may further comprise a method for creating hydrogen gas comprising: providing a first quantity of water liquid to a preparation chamber; heating the first quantity of water liquid within the preparation chamber, wherein the water liquid transitions to a gaseous state; directing, the gaseous water through an aeration chamber, wherein the gaseous water is deaerated; transferring the deaerated gaseous water into a reaction chamber, wherein the deaerated gaseous water transitions to a liquid state; distributing a predetermined flow rate of the deaerated water liquid into a container, wherein the container is feed a flow rate of alkali fragments of a predetermined particle size; initiating a reaction between the deaerated water liquid and a quantity of alkali fragments within a container, wherein hydrogen gas and an alkali hydroxide are produced; separating the hydrogen gas from the reaction chamber; and processing the alkali hydroxide, wherein a second chemical reaction converts the alkali hydroxide to alkali and water.

BRIEF DESCRIPTION OF THE DRAWINGS

FIG. 1 depicts a schematic drawing of a reaction system, in accordance with one embodiment of the present invention.

DETAILED DESCRIPTION OF THE INVENTION

The present invention provides a method and device for the creation of hydrogen as a by-product of a reaction with an alkali metal to produce hydrogen, heat, and an additional by-product based on the specific type of alkali metal used. In the embodiments, described below sodium will be used, but other alkali metals can be used to produce the hydrogen, heat, and additional by-product. For example, lithium, potassium, rubidium, caesium, and francium can be used. Sodium is used due to its abundance and ease of production.

The sodium used in the reaction is in a solid state. The sizes of the pieces of the sodium may vary. The finer the pieces of sodium, the greater the surface area and thereby increasing the reaction with the water. In a preferred embodiment, the sodium in cut into fine pieces to improve this reaction. The cutting or modification of the sodium pieces may be performed off site, or may occur through the use of additional equipment on site.

FIG. 1 depicts the drawing of a reaction system 100, in accordance with one embodiment of the present invention. The methodology of the step by step process is described. A conduit 201 provides the fluid flow of liquid water into chamber 200 and the conduit 201 is coupled with an interior cavity of the chamber 200. The chamber 200 is used to prepare water for the reaction within chamber 300, wherein a chemical reaction between the water produces hydrogen gas, and a by-product. The chamber 200 is operable to receive the water. The chamber 200 is coupled with a heating element 204, whereby the heating element alters the temperature of the water and the internal cavity of the chamber 200. In some embodiments, the chamber 200 encapsulated or insulated to assist in reducing the energy needed to heat, and the retention of the hear produced by the heating element 204. This provides the benefit of maintaining the internal cavity of chamber 200 at a constant temperature. In some embodiments, the chamber 200 is pressurized and the pressure is adjustable within the internal cavity of the chamber 200. By increasing the pressure, the required temperature to transition the water from liquid to gas is reduced. In a preferred embodiment, the pressure within chamber 200 is held at 0.034 bars of pressure (3400 Pascal). This pressure/vacuum assists in lowering the boiling temperature of the water within chamber 200. Additional pressures may be employed based on the specifics of the alkali metal used for the reaction and the condition of the water. Chamber 200 is heated through the use of heating element 204 which is positioned around chamber 200 to assist in maintaining an even temperature throughout the chamber 200. In the depicted embodiment, the heating element 204 is integrated within the base 203 of the chamber 200 where the majority of the water is held in a liquid state. In additional embodiments the base 203 may be a form of insulation, which can substantially encapsulate the entire chamber 200. In one embodiment, the chamber 200 is held at 0.034 bars, the temperature within the chamber 200 is preferably 70.5 degrees Fahrenheit. This temperature at the desired pressure boils the water and creates a water steam. In some embodiments, chamber 200 is entirely insulates to further reduce the lose of heat and the additional energy needed to heat the heating element 204 and keep the gaseous water from return to liquid form. The heating element 204 is positioned in a predetermined location distal to the chamber 200 to provide adequate heat to the chamber to reach the desired temperature. This could include, as shown, positioned in the base 203 on the chamber 200, or may be wrapper around the chamber 200. In additional embodiments, where chamber 200 has an insulated cover surrounding a substantial portion of the chamber 200, the heating element is positioned distal to the exterior surface of the chamber 200 and between the insulation and the chamber 200. In some embodiments, the heating element 204 is located within the internal cavity of the chamber 200. In additional embodiments, more than one heating element 200 may be used to heat the water.

The water, once in the gaseous (or vapor) state is separated from the liquid water and is in fluid flowing relation relative to conduit 214 where a pump 215 controls the flow of the water vapor. In the depicted embodiment, a deaerator 215 is integrated into conduit 214. Through the deaeration process, the removal of dissolved or entrained gases from the water, this deaeration process assists in reducing the volatility of the reaction with the alkali metal, and reduce the possibility for an explosion, and to generally reduce the violent nature of the reaction. The primary purpose of the deaeration is to remove the dissolved oxygen from the water which naturally occur and cause the relation to become more unstable and erratic. The deaeration process can be performed through chemical or mechanical means. In some embodiments, the water is deaerated prior to entering chamber 200.

The deaerated water vapor, is transferred from chamber 200 to chamber 300, through a conduit 214 which extends from chamber 200 and into chamber 300. The deaerated water vapor is transferred from chamber 200 and into chamber 300 through the use of the pump 213. In additional embodiments, the pump 213 is replaced by fan or other mechanical device that can control the flow rate and volume of deaerated water vapor transfer or flow rate. The deaerated water vapor returned to a heated liquid within the conduit 214 and is expelled through an opening 211. Opening 211 is designed to permit the deaerated water liquid to exit the conduit 214 at a predetermined coverage area, flowrate, and volume into change into container 302. Container 302 is positioned within chamber 300 distal to the opening 211 of conduit 214.

The container 302 is fed alkali metal fragments 304 through a manual or automatic feeding system 309 to maintain a steady or controlled amount of alkali metal fragments 304 within container 302 for the reaction to occur. The alkali metal fragments 304 are processed in the feeding system 309 and travel through a conduit to the container 302. The flow of the alkali metal fragments is relative to the water flow. The flow of alkali metal fragments 304 may be monitored by external systems to assist in maintaining a desired quantity of fragments in the container. The feeding system may also include a process that takes larger fragments of the alkali metal and break these fragments down into smaller pieces, or even into a powder depending on the required size of the fragments for the reaction to occur. It should be recognized that alkali metal fragments 304 may be added to the system at a number of different locations in order to meet the needs of the chemical reactions. These locations include directly at the chemical reactor, or further downstream in the process which will be discussed below. Various alkali metals may be used in the process.

While the discussion above indicates that the source of deaerated hydrogen dioxide is provided first, and then reacted with the alkali metal fragments 304, it should be understood that this order is not important and these compositions could be supplied in reverse order, or together to achieve the benefits of the present methodology.

Container 302 is incapsulated with a cooling element 308 to assist in reducing the heat in and around the container 302. As the deaerated water returns to a liquid state and is directed into the container 302 holding the alkali metal fragments 304. The deaerated water reacts with the alkali metal fragments 304 and the reaction creates a by-product and hydrogen gas. The by-product (where sodium is used, the by-product is sodium hydroxide) is released, through an exhaust conduit 307 into a lower portion of the chamber 300 and removed through conduit 305. The water gas is in fluid flowing relation relative to conduit 306 and removed from the chamber 300, where the hydrogen is stored in additional storage facilities. A pump 215 is used to assist in the removal of the hydrogen gas before re-reacting with the water, or the by-product. In the depicted embodiment, chamber 300 is partially encapsulated with the cooling element to assist in reducing the likelihood of the reaction between the deaerated water and the alkali metal causing an explosion. Through the maintain a temperature, the aggressiveness of the reaction is minimized. This is also achieved through the controlled release of the water, the amount of alkali metal fragments 304, and the size of the alkali metal fragments 304.

Expansion engines are well known in the art and include internal turbines (not shown) and which, when exposed to the flow of the hydrogen gas, produces a first mechanical output.

The sodium hydroxide, which is generated as a result of this chemical reaction, may then be recycled or reused by exiting or passing from the chamber 300 and being removed by way of the conduit or passageway 305 to another chamber or system that separates the hydrogen, oxygen, and sodium (or other alkali metal) to be reused. In some embodiments, the passageway 305 is connected to conduit 307 to directly remove the sodium hydroxide from the chamber 300. In additional embodiments a pump or vacuum is implemented to remove the sodium hydroxide (or alkali metal hydroxide) from the chamber 300 in an expedited fashion to reduce the opportunity for the hydrogen gas to react with the sodium hydroxide.

The methodology of the present invention may further include the step of providing the source of hydrogen gas produced in the container 302 to a hydrogen dryer which is incorporated into the conduit 306. This dryer could be any type of commercial dryer. The hydrogen dryer is utilized to remove any water, or other liquids which may be mixed with the hydrogen gas, thereby making it more useful for particular applications. As should be understood, this hydrogen dryer may not be necessary for certain applications because there are benefits to be derived from having, for example, gaseous water mixed with the resulting hydrogen gas. This mixture would be useful as a fuel which may be utilized in proton exchange membrane fuel cells and the like.

In various embodiments, chamber 200 and 300 have various pressure gauges, temperature gauges, and pressure relief values. These are used to monitor the pressure and temperature of the chambers and communicate with the heating and cooling systems to maintain the desired temperature, and also allow for the activation of the pressure relief value to maintain the desired pressure within the chambers.

The conduit 201 controlling the flow of the water may have various shut of valves and pumps to control the flow of water into the chamber 200. As well as conduit 214, 306, 307, and 305 may also have various pumps and shutoff values to control the flow of hydrogen into the storage facilities.

The by-product can be later reused or recycled to form additional chemical hydride which is can be used in later chemical reactions or processed to create more metal alkali fragments 304.

A method of producing hydrogen of the present invention is best understood by a study of the drawing. The present methodology includes a step of providing a water liquid within a first chamber 200, wherein the water is heated to produce a water vapor. The vapor is reacted with a quantity of prepared alkali metal fragments (or powder) to produce hydrogen gas and a by-product. Wherein the by-product could be reused in subsequent chemical reactions.

In some embodiments, the hydrogen gas is used within an expansion engine or the like to generates a power output.

Therefore, it will be seen that the present invention provides many advantages over the prior art devices and methods and which have been utilized heretofore to produce chemical hydrides which are useful in the production of hydrogen gas at remote locations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for generating hydrogen gas comprising:
   a preparation chamber having a liquid water inlet, a heating element distal to an interior cavity of the preparation chamber, and a first end of a vapor water outlet;
   a mechanical pump secured to a second end of the vapor water outlet and a first end of a vapor water inlet;
   a disbursement member secured to a second end of the vapor water inlet;
   a pressure regulated reaction chamber having a reaction container positioned distal to the disbursement member, and the reaction container having a byproduct outlet, and a hydrogen exhaust outlet positioned distal to the reaction container, wherein the reaction chamber is encapsulated with a cooling element; and
   a feeder within the pressure regulated reaction chamber, wherein the feeder feeds alkali fragment into the pressure regulated reaction chamber to react with a quantity of water provided from the disbursement member.

2. The apparatus of claim 1, further comprising, an insulation element covering substantially the preparation chamber.

3. The apparatus of claim 1, wherein the heating element is located within the interior cavity of the preparation chamber.

4. The apparatus of claim 1, further comprising, a deaeration system in fluid flow communication with the vapor water outlet.

5. A method for creating hydrogen gas comprising:
   providing a first quantity of deaerated water to a preparation chamber;
   heating a quantity of the water within a first sealed pressurized chamber of the preparation chamber, wherein the first quantity of water transitions into a gaseous state;
   directing, the gaseous water into a pressurized and temperature controlled reaction chamber;
   initiating a reaction between the gaseous water and a quantity of alkali fragments within a second chamber within the reaction chamber to produce hydrogen gas and an alkali hydroxide;
   separating the hydrogen gas from the alkali hydroxide; and
   recovering the hydrogen gas.

6. The method of claim 5, further comprising, converting the gaseous water to a deaerated liquid state prior to initiating the reaction.

7. The method of claim 5, wherein the separated hydrogen gas is used to produce a work output.

8. The method of claim 5, wherein the quantity of alkali fragments are processed to a predetermined particle size prior to the reaction.

9. The method of claim 6, wherein the liquid water is introduced at a controlled flow rate with the alkali fragments.

10. The method of claim 9, wherein the particle size of the alkali fragments and the flow rate of the liquid water are adjustable.

11. The method of claim 1, wherein the preparation chamber is maintained at a pressure 0.034 bars and a temperature of 70 degrees Fahrenheit.

12. The method of claim 11, wherein the pressure and temperature are related and are adjustable based on the relationship.

13. A method for creating hydrogen gas comprising:
providing a first quantity of water liquid to a preparation chamber;
heating the first quantity of water liquid within the preparation chamber, wherein the water liquid transitions to a gaseous state;
directing, the gaseous water through an aeration chamber, wherein the gaseous water is deaerated;
transferring the deaerated gaseous water into a reaction chamber, wherein the deaerated gaseous water transitions to a liquid state;
distributing a predetermined flow rate of the deaerated water into a container and the container is pressure and temperature controlled, wherein the container is feed alkali fragments of a predetermined particle size at a predetermined flow rate, and initiating a reaction between the deaerated water and the alkali fragments within the container, wherein hydrogen gas and an alkali hydroxide are produced; and
separating the hydrogen gas from the reaction chamber.

14. The method of claim 13, wherein a heating element is present within the preparation chamber, and provides a controlled heat source for the conversion of the water from a liquid to a gaseous state.

* * * * *

UNITED STATES PATENT AND TRADEMARK OFFICE
CERTIFICATE OF CORRECTION

PATENT NO. : 11,345,592 B2
APPLICATION NO. : 16/940572
DATED : May 31, 2022
INVENTOR(S) : Hamm et al.

It is certified that error appears in the above-identified patent and that said Letters Patent is hereby corrected as shown below:

On the Title Page

Item (12) "Hamm" should read -- Hamm et al. --.

Item (72) Inventor is corrected to read:
-- Earl Lorenzo Hamm, Conyer, GA (US);
Steven John Cunningham, Johnson Creek, WI (US) --.

Signed and Sealed this
Twentieth Day of September, 2022

Katherine Kelly Vidal
*Director of the United States Patent and Trademark Office*